US012027171B2

(12) United States Patent
Raynor et al.

(10) Patent No.: US 12,027,171 B2
(45) Date of Patent: Jul. 2, 2024

(54) CREATING A PRINTED PUBLICATION, AN E-BOOK, AND AN AUDIO BOOK FROM A SINGLE FILE

(71) Applicant: 105 Publishing LLC, Austin, TX (US)

(72) Inventors: Jason Lloyd Raynor, Austin, TX (US); Patricia Louise Jones, Austin, TX (US)

(73) Assignee: 105 Publishing LLC, Austin, TX (US)

( * ) Notice: Subject to any disclaimer, the term of this patent is extended or adjusted under 35 U.S.C. 154(b) by 316 days.

(21) Appl. No.: 17/402,991

(22) Filed: Aug. 16, 2021

(65) Prior Publication Data

US 2023/0049537 A1  Feb. 16, 2023

(51) Int. Cl.
| | |
|---|---|
| *G10L 15/26* | (2006.01) |
| *G06F 16/635* | (2019.01) |
| *G06F 16/68* | (2019.01) |
| *G06F 16/683* | (2019.01) |
| *G06V 30/32* | (2022.01) |
| *G10L 21/0216* | (2013.01) |
| *G06V 30/10* | (2022.01) |

(52) U.S. Cl.
CPC ............ *G10L 15/26* (2013.01); *G06F 16/635* (2019.01); *G06F 16/685* (2019.01); *G06F 16/686* (2019.01); *G06V 30/32* (2022.01); *G10L 21/0216* (2013.01); *G06V 30/10* (2022.01)

(58) Field of Classification Search
CPC ................................ G10L 21/00; G10L 15/26
See application file for complete search history.

(56) References Cited

U.S. PATENT DOCUMENTS

| | | | | |
|---|---|---|---|---|
| 9,361,377 B1* | 6/2016 | Azari | ................. | G06F 16/951 |
| 9,495,974 B1* | 11/2016 | Chang | ................. | G10L 21/0364 |
| 9,881,009 B1* | 1/2018 | Weight | ................. | G06F 16/93 |
| 2004/0267552 A1* | 12/2004 | Gilliam | ................. | G06F 21/10 |
| | | | | 705/902 |
| 2008/0267426 A1* | 10/2008 | De Poortere | ............ | H04R 3/04 |
| | | | | 381/98 |
| 2009/0157490 A1* | 6/2009 | Lawyer | ................. | G06F 16/00 |
| | | | | 707/999.005 |
| 2009/0157667 A1* | 6/2009 | Brougher | ................. | G06F 16/25 |
| | | | | 707/999.005 |
| 2011/0066526 A1* | 3/2011 | Watson | ................. | G06Q 20/123 |
| | | | | 705/310 |
| 2014/0250219 A1* | 9/2014 | Hwang | ................. | G06F 40/45 |
| | | | | 709/224 |
| 2014/0250355 A1* | 9/2014 | Jimison | ................. | G06F 3/0483 |
| | | | | 715/202 |

(Continued)

*Primary Examiner* — Richa Sonifrank
*Assistant Examiner* — Alvin Iskender
(74) *Attorney, Agent, or Firm* — Shiv S. Naimpally; Flagship Patents

(57) ABSTRACT

As an example, a server may receive, from a computing device, a submission created by an author. The submission includes book data associated with a book and author data associated with the author. The author data includes incarceration data indicating whether the author was incarcerated. The server may determine, based on the author data and the book data, that the submission is publishable. The server may create, based on the book data, a printable book, an e-book, and an audio book and make one or more of the printable book, the e-book, and the audio book available for acquisition.

20 Claims, 5 Drawing Sheets

(56) References Cited

U.S. PATENT DOCUMENTS

| | | | |
|---|---|---|---|
| 2015/0046346 A1* | 2/2015 | Juola | G06F 21/31 |
| | | | 705/310 |
| 2015/0356967 A1* | 12/2015 | Byron | G10L 25/51 |
| | | | 704/260 |
| 2016/0381083 A1* | 12/2016 | Torgersrud | G06Q 50/22 |
| | | | 709/225 |
| 2020/0043511 A1* | 2/2020 | Raikar | G11B 27/005 |
| 2021/0173529 A1* | 6/2021 | Mostaert | H04W 4/90 |

* cited by examiner

CREATING A PRINTED PUBLICATION, AN E-BOOK, AND AN AUDIO BOOK FROM A SINGLE FILE

BACKGROUND OF THE INVENTION

Field of the Invention

This invention relates generally to book publication and, more particularly to a system to create a printed publication, an electronic book (e.g., e-book), and an audio book from a single file.

Description of the Related Art

In the past, an author who desired to be published would publish a printed publication. With new forms of technology, an author who desires to publish a book has the option to publish a printed publication, an e-book, an audio book, or any combination thereof. The requirements to publish each of the different types of books are different causing the author to have to prepare all three types of books.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

As an example, a server may receive, from a computing device, a submission created by an author. The submission includes book data associated with a book and author data associated with the author. The server determines based on the author data and the book data, that the submission is publishable and creates, based on the book data, a printable book, an e-book, and an audio book. The server provides one or more of the printable book, the e-book, and the audio book for acquisition, for example, via an e-commerce site.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
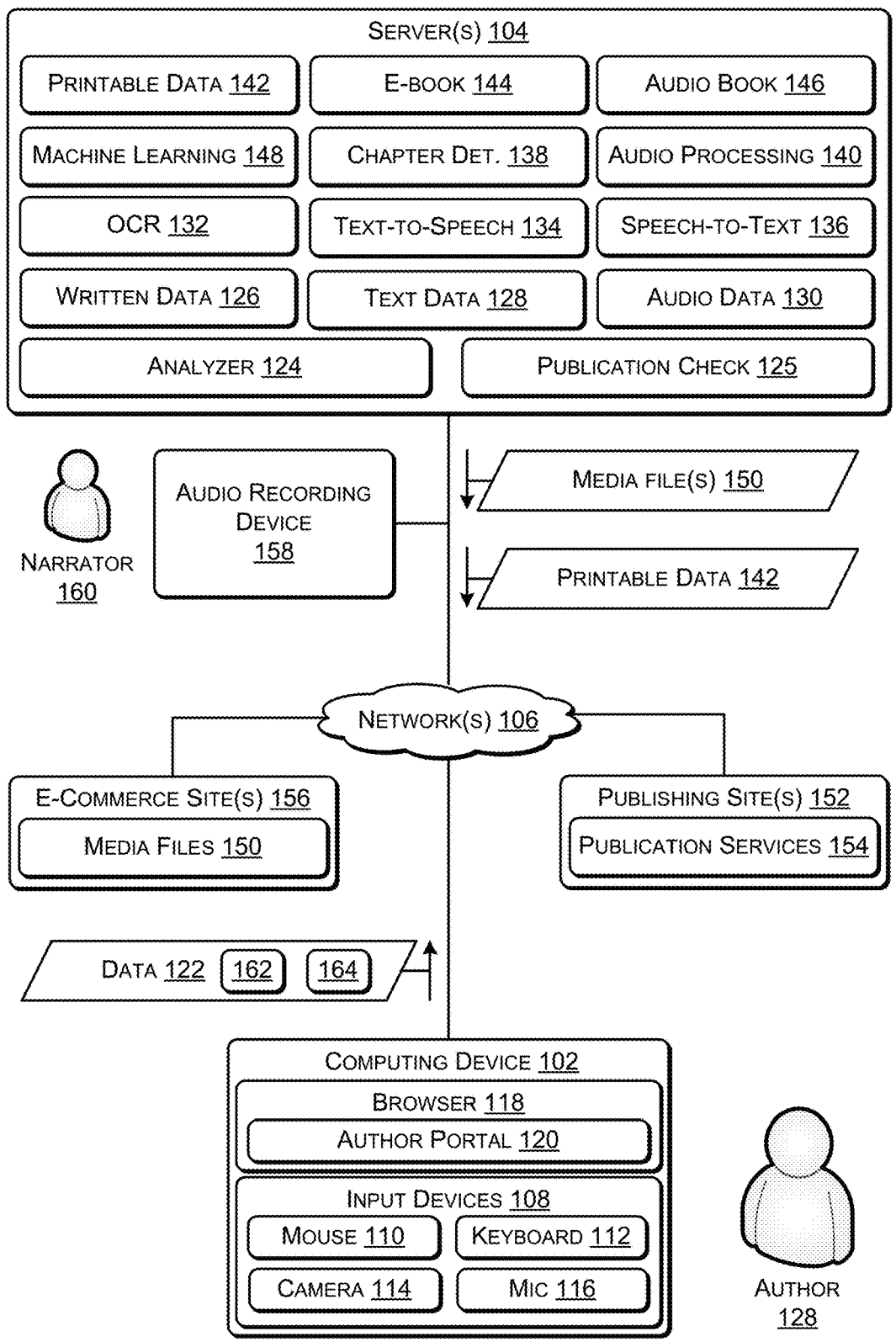
FIG. 1 is a block diagram of a system that includes a server to receive a single data file and create two or more publications, according to some embodiments.

The systems and techniques described herein enable an author to create a single file, such as a text file or an audio file, and submit the single file to a publisher. The text file may be submitted in a variety of formats including, for example, text format, Microsoft® Word® format, portable digital file (PDF) format, Pages format, or the like. The audio file maybe in a variety of audio formats including, for example, a lossless format (e.g., .wav, free lossless audio codec (FLAC), or the like) or a lossy format (e.g., .mp3, .m4a, or the like). The publisher converts the single file into a printable manuscript, an audio book, and an e-book. The e-book may be created using one or more formats, such as, epub, azw, mobi, pdf, html, doc, docx, or the like. In this way, the author can create a single file and have a book published in three different formats, e.g., printed form, audio form, and electronic book form. As used herein, the term "publish" refers to taking a manuscript (e.g., in text, written, or audio form), editing the content of the manuscript, formatting the content for print and for e-book, creating a book cover or formatting a book cover created by the author (or an agent of the author), and uploading the e-book to a platform (e.g., e-commerce site) that sells books and/or creating a physical copy of the printable book and offering it for sale via the platform. Publishing an audio book includes taking an audio file (e.g., MP3, WAV, or the like), editing the audio file sufficiently for a reader to understand, and uploading the edited audio file to a platform (e.g., e-commerce site) that provides audio books for acquisition (e.g., lease, purchase, or the like).

For example, the author may use a recording device (e.g., portable digital recorder, a computing device that has a microphone, or the like) to record an audio file. Creating the audio file is relatively easy because the author does not type the manuscript, thus enabling authors that do not have access to a keyboard, have limited reading and/or writing skills, or the like, to be able to publish a book. The author is able to create an audio file by speaking into a microphone to record the author's own words. After submitting the audio file to server of a publisher, the server may use the audio file to create an audio book, and use text-to-speech technology to convert the audio file into text data that can be used to create an e-book, a manuscript for a printed publication, or both. In this way, an author with limited skills (e.g., typing skills) or an author that lacks access to a keyboard is able to submit a single audio file that the publisher can use to create an audio book, an e-book, and a manuscript for printed publication. For example, incarcerated inmates who have a story to tell, be it fiction or non-fiction, are able to author and publish a book in all three formats by creating a single audio file. As another example, those having disabilities (e.g., that limit their ability to use a keyboard to create a text file) are able to author and publish a book in all three formats without having to type a manuscript.

As another example, an author may have limited access to a computing device. The author may create a manuscript by manually (e.g., by hand) printing or writing a manuscript, scan the manuscript, and send the scanned manuscript to the server of the publisher. The term "scan" also refers to taking photographs of the manuscript. The publisher may use optical character recognition (OCR) technology to convert the scanned manuscript into text data that can be used to create a printable publication and an e-book. In some cases, the author may also provide an audio file in which the author reads out loud the contents of the manuscript. In such cases, the publisher may use the audio file to create the audio book. If the author provides both a manually created manuscript and an audio file, the publisher may convert the manually created manuscript into a first text file using OCR, convert the audio file into a second text file using speech-to-text, and compare the two text files to identify and address typographical, spelling, and other types of minor errors. In other cases, where the author has not provided an audio file, the publisher may record a narrator reading the manuscript out loud to create the audio book. In still other cases, the publisher may use text-to-speech technology to convert the text data into audio data.

As a further example, an author may use a computing device with a keyboard to create a text file and send the text file to the server of the publisher. The publisher may use the text file to create a printable publication and an e-book. In some cases, the author may also provide an audio file in which the author reads out loud the contents of the text file. In such cases, the publisher may use the audio file to create the audio book. If the author provides both a text file and an audio file, the publisher may convert the audio file into a second text file using speech-to-text, and compare the two text files to identify and address typographical, spelling, and other types of minor errors. In other cases, where the author has not provided an audio file, the publisher may record a narrator reading the text file out loud to create the audio book. In still other cases, the publisher may use text-to-speech technology to convert the text into audio data.

Thus, an author may create one or more data files and send them to a server associated with a publisher. For example, the data files may include an audio file of the author reading out loud, a text-based file (e.g., text, Word compatible, PDF compatible, Pages compatible, or the like) created by using an input device (e.g., a keyboard), a scan of a handwritten manuscript, or any combination thereof. Based on the type of data file said, the publisher may use various techniques to create an audio book, an e-book, and a printable book.

There are several advantages provided by the systems and techniques described herein. First, authors can submit a single file and have the file published in three formats, e.g., as an audio book, as an e-book, and as a printed publication. Second, authors can use whatever means are at their disposal to create the single file. For example, those incarcerated in a prison can create an audio file, a handwritten manuscript, a typed manuscript, or any combination thereof. Third, authors with disabilities, such as those who are unable (or have limited capabilities) to write or type, are able to submit an audio file while those who are unable to speak are able to submit a handwritten or typed manuscript. In this way, publishing a book is made accessible to a large number of people as compared to conventional techniques where the author submits a text-based, typed manuscript in a particular format specified by the publisher.

As a first example, a server performs a method that includes receiving, from a computing device, a submission created by an author. The submission includes book data and author data associated with the author. For example, the book data may include a title of the book, graphics (e.g., photographs, sketches, paintings, or the like) to be included in the book and information as to where in the book they are to be located, chapter information including a name of each chapter and where each chapter is located, the book, a book format type (e.g., .txt, .doc, .docx, .pdf, .wav, .mp3, .m4a, .flac, or the like), other information associated with the book, or any combination thereof. The author data may include the author's name, the author's mailing address, whether the author was incarcerated, why the author was incarcerated, where the author was incarcerated, an attestation that the submission is solely the work of the author, other author-related information, or any combination thereof. The method includes determining, based on the author data and the book data, that the submission is publishable. The method includes creating, based on the book data, a printable book, an e-book, and an audio book and making one or more of the printable book, the e-book, and the audio book available for acquisition (e.g., via an e-commerce website, such as a website associated with the publisher, or a third-party website, such as Amazon®, Apple® books, Audible®, or the like). The method may include determining that the book data includes audio data, performing audio processing on the audio data to create modified audio data, and creating the audio book based at least in part on the modified audio data. For example, performing the audio processing may include reducing an amount of extraneous noise present in the audio data based on filtering out frequencies that are: (i) above a first frequency and (ii) below a second frequency. As another example, performing the audio processing may include determining that a pitch of a portion of the audio data is outside a particular frequency range and adjusting the pitch of the portion of the audio data to be within the particular frequency range. As a further example, performing the audio processing may include determining that a speed of narration in the audio data is outside a particular speed range and adjusting the speed of the narration in the audio data to be within the particular speed range. The method may include determining that the book data includes audio data, converting the book data to text data using speech-to-text, creating the audio book based on the audio data, creating the e-book based on the text data, and creating the printable book based on the text data. The method may include determining that the book data includes written data, converting the written data to text data using optical character recognition, creating the e-book based on the text data, and creating the printable book based on the text data.

As a second example, a server includes one or more processors and one or more non-transitory computer readable media storing instructions executable by the one or more processors to perform various operations. The operations include receiving, from a computing device, a submission created by an author. The submission includes book data associated with a book and author data associated with the author. The operations include determining, based on the author data and the book data, that the submission is publishable. The operations include creating, based on the book data, a printable book, an e-book, and an audio book. The operations include making one or more of the printable book, the e-book, and the audio book available for acquisition. The operations may include receiving, from a second computing device, a second submission created by a second author. The second submission includes second book data associated with a second book and second author data associated with the second author. The operations may include determining, based on the second author data and the second book data, that the second submission is unpublishable and sending a message to the second author indicating that the second submission is unpublishable. For example, determining, based on the second author data and the second book data, that the second submission is unpublishable may include determining that the second author was incarcerated and determining that a content of the second submission is associated with a crime including a particular crime associated with a reason why the second author was incarcerated. As another example, the author may be prohibited (e.g., by a court order) from discussing one or more topics in the book. The operations may include determining that the book data comprises audio data, performing audio processing on the audio data to create modified audio data, and creating the audio book based at least in part on the modified audio data.

Performing the audio processing may include determining that a speed at which the author is performing a narration in the audio data is outside a particular speed range. Based on determining that the speed at which the author is performing the narration in the audio data is less than a lower limit of the particular speed range, the operations may include reducing a time of one or more pauses between words in the narration to increase the speed of the narration in the audio data to be within the particular speed range. Based on determining that the speed at which the author is performing the narration in the audio data is greater than an upper limit of the particular speed range, the operations may include increasing a time of the one or more pauses between words spoken in the narration to increase the speed of the narration in the audio data to be within the particular speed range. Performing the audio processing may include capturing a portion of audio in a pause between words in the audio data, performing a frequency analysis of the portion of audio in the pause between words spoken, and performing noise reduction by removing, from the audio data, at least a portion of frequencies identified in the frequency analysis. The operations may include determining that the book data includes audio data, converting the book data to text data using speech-to-text, creating the audio book based on the audio data, creating the e-book based on the text data, and creating the printable book based on the text data.

As a third example, one or more non-transitory computer-readable media may store instructions executable by one or more processors to perform various operations. For example, the operations include receiving, from a computing device, a submission created by an author. For example, the submission may include book data associated with a book and author data associated with the author. The operations include determining, based on the author data and the book data, that the submission is publishable. The operations include creating, based on the book data, a printable book, an e-book, and an audio book and making one or more of the printable book, the e-book, and the audio book available for acquisition. The operations may include determining that the book data includes audio data, converting the audio data to text data using speech-to-text, creating the audio book based on the audio data, creating the e-book based on the text data, and creating the printable book based on the text data. The operations may include determining that the book data includes written data, converting the written data to text data using optical character recognition, creating the e-book based on the text data, and creating the printable book based on the text data. The operations may include determining that the book data includes text data, creating the e-book based on the text data, and creating the printable book based on the text data. The operations may include receiving, from a second computing device, a second submission created by a second author. The second submission includes second book data associated with a second book and second author data associated with the second author. The operations include determining, based on the second author data and the second book data, that the second submission is unpublishable and sending a message to the second author indicating that the second submission is unpublishable. For example, determining, based on the second author data and the second book data, that the second submission is unpublishable may include determining that the second author was incarcerated and determining that a content of the second submission is associated with a crime.

FIG. 1 is a block diagram of a system 100 that includes a server to receive a single data file and create two or more publications, according to some embodiments. The system 100 includes a representative computing device 102 connected to one or more servers 104 via one or more networks 106.

The computing device 102 may be a smart phone, a tablet, a laptop, a desktop, a 2-in-1 device (e.g., a tablet that can be converted into a laptop by attaching a keyboard), another type of computing device, or a combination thereof. The computing device 102 may include one or more input devices 108 such as, for example, a mouse 110, a keyboard 112, a camera 114, a microphone ("mic") 116, or any combination thereof. The computing device 102 may execute one or more applications ("apps"), such as a browser 118. The user of the computing device 102, such as an author 128, may use the browser 118 to navigate to an author portal 120 associated with a publisher. The author portal 120 may enable the author 128 to submit data 122 to the publisher for publication. For example, the data 122 may include audio data captured by the microphone 116, text data captured by the keyboard 112, scan data (e.g., of a handwritten manuscript) captured by the camera 114, or any combination thereof. The data 122 may include book data 162 and author data 164. The book data 162 may include a title of the book, graphics (e.g., photographs, sketches, paintings, or the like) to be included in the book and information as to where in the book they are to be located, chapter information including a name of each chapter and where each chapter is located, a book format type (e.g., .txt, .doc, .docx, .pdf, .wav, .mp3, .m4a, .flac, or the like), other information associated with the book, or any combination thereof. The author data 164 may include information associated with the author 128 such as, for example, the author's name, the author's mailing address, whether the author 128 was incarcerated, why the author 128 was incarcerated, where the author 128 was incarcerated, an attestation that the submission is solely the work of the author 128, other author-related information, or any combination thereof.

The server 104 may receive the data 122 via the author portal 120 and use an analyzer (e.g., software) 124 to analyze the data 122 to determine what type(s) of data has been submitted. The data 122 may include information associated with the author 128, such as the author's name, the authors address, and other relevant information. For example, if the author 128 is currently or was previously incarcerated, the data 122 may include where the author 128 was incarcerated and the associated crime. The server 104 may perform a publication check 125 to determine, based on author information (e.g., conviction, incarceration history, and the like) in the data 122 that is associated with the author 128, whether the author 128 is permitted to publish the submitted data. For example, the publication check 125 may send a query to a local, state, and/or federal government agency to determine whether the author 128 is permitted to publish the submitted data. If the author 128 is not permitted to publish the submitted data, then the server 104 may send a message to the author 128 indicating that the author 128 is not permitted to publish the submitted data. Machine learning 148 (and, in some cases, human editors) may analyze the data 122 to determine whether the data 122 includes suitable for publication. If the author is (or was) a prison inmate, the publication check 125 may determine whether the content glorify what the author was incarcerated for or glorify crime in general, and whether the content will be detrimental to the image of the publisher. If the author is (or was) a prison inmate and the publication check 125 determines that the content appears to glorify what the author was incarcerated for, appears to glorify crime in general, or the content may be detrimental to the image of the publisher, then the server 104 may send a message to the author 128 indicating that the data 122 is unpublishable. In some cases, the server 104 may provide suggestions on revising the content of the data 122 to make the revised content publishable. The publication check 125 may determine whether the data 122 includes illegal material, such as content associated with bestiality, incest, pedophilia, or rape (BIPR). If the publication check 125 determines that the data 122 includes BIPR, then the server 104 may indicate to the author 128 that the data 122 is not publishable.

If the publication check 125 indicates that the author is permitted to publish the submitted data 122, then the analyzer 124 determines what to do with the submitted data 122. For example, if the analyzer 124 determines that the data 122 includes written data 126, then the server 104 may perform optical character recognition (OCR) 132 to convert the written data 126 into text data 128. If the analyzer 124 determines that the data 122 includes audio data 130 (e.g., an audio file of the author 128 reading the contents of the manuscript), then the server 104 may use a speech-to-text module 136 to convert the audio data 130 into the text data 128.

If the data 122 does not include the audio data 130 (e.g., the author 128 did not read the book into the microphone 116), in some cases, the server 104 may use the text-to-speech 134 to convert the text data 128 and to the audio data 130. In other cases, the publisher may ask a narrator 160 to speak into an audio recording device 158 to create the audio data 130. Thus, if the author 128 does not provide the audio data 130 (e.g., that is used to create an audio book 146), then the publisher may, in some cases, ask the narrator 160 to read the text data 128 out loud and record the narrator 160 using the audio recording device 158 to create the audio data 130. For example, the narrator 160 may perform the narration of the text data 128 in a recording studio. The audio recording device 158 may be a computing device with a microphone and recording software, a digital recorder, or the like.

If the analyzer 124 determines that the data 122 includes the text data 128 (or if the written data 126 was converted into the text data 128), then the text data 128 may be analyzed using a chapter determination module 138. For example, in some cases, the data 122 may include locations where the author 128 indicates that a chapter should begin or end. To illustrate, in the audio data 130 the author 128 may say "Start of Chapter N" (N>0) before starting a chapter and may say "End of Chapter N" after ending a chapter. As another example, the audio data 130 may include multiple files, with each file numbered and having a chapter name. As a further example, the written data and the text data may include writing or text indicating "Chapter N" to indicate both the start of a new chapter and to indicate the end of the previous chapter (e.g., Chapter N−1).

In some cases, the audio data 130 may undergo audio processing 140. For example, the audio processing 140 may perform noise reduction and speech clarity improvements to the audio data 130 using digital signal processing (DSP).

Based on the text data 128 and the chapter determination module 138, the server 104 may create an e-book 144 and printable data 142 (e.g., used to create a printed book). The e-book 144 may be created in one or more formats, such as, epub, azw, mobi, pdf, html, doc, docx, or the like. Based on the audio data 130 and the audio processing module 140, the server 104 may create an audio book 146. The audio book 144 may be created in one or more formats, such as, way, mp3, m4a, flac, or the like.

In some cases, the server 104 may include a machine learning algorithm 148. The machine learning 148 may perform one or more of the tasks described herein, such as working with the OCR 132 to convert the written data 126 to the text data 128, the text-to-speech 134 to convert the text data 128 to the audio data 130, the speech-to-text 136 to convert the audio data 130 to the text data 128, the chapter determination 138 to determine chapters (if the author 128 has not identified the chapters), the audio processing 140, or any combination thereof. For example, the machine learning 148 may be a type of classifier, such as a support vector machine, that is used to predict text when analyzing the audio data 131 to perform the speech-to-text 136 conversion to create the text data 128. The machine learning 148 may similarly be used to perform other tasks where machine learning may be applied.

After the server 104 has received the data 122 from the author 128 and created the printable data 142, the e-book 144, and the audio book 146, the server 104 may send the printable data 142, to a publishing site 152. The publishing site 152 may include publication services 154 that are able to create a printed ("hardcopy") book based on the printable data 142. For example, the publication services 154 may print a run of multiple hardcopy books, provide a print-on-demand service where a single book is printed when a customer purchases a printed book, or both. The server 104 may send the media files 150 (e.g., the e-book 144 and the audio book 146) and the printable data 142 to one or more e-commerce sites 156. The e-commerce sites 156 may enable the e-book 144 and the audio book 146 to be purchased and downloaded and may enable purchase of a printed version of the printable data 142.

Thus, an author may create a manuscript for a book by creating one or more files, such as text data (e.g., by typing into a keyboard), audio data (e.g., by speaking into a microphone), or written data (e.g., by writing by hand), or any combination thereof. The author may submit the one or more files to a server associated with a publisher, such as, for example, via an author portal of the publisher's website. The server may use speech-to-text to convert the audio data into text data. The server may use OCR to convert the written data into text data. The server may use the text data to create printable data that can be used to create a printed version of the book. The server may use the text data to create an e-book that can be read using an e-book reader device or a computing device with an e-book reader application. The server may use the audio data to create an audio book. If the author does not provide audio data, the server may use text-to-speech to create audio data from the text to data or the publisher may record a narrator reading out loud the text data to create the audio data. In this way, authors such as currently or previously incarcerated individuals, those with disabilities (e.g., that make it difficult for them to type), and the like are able to create a book in all three formats (e.g., printed, electronic, and audio) with one or more files. For example, anyone who can speak can author a book in all three formats by submitting a single audio file.

Figure 2:
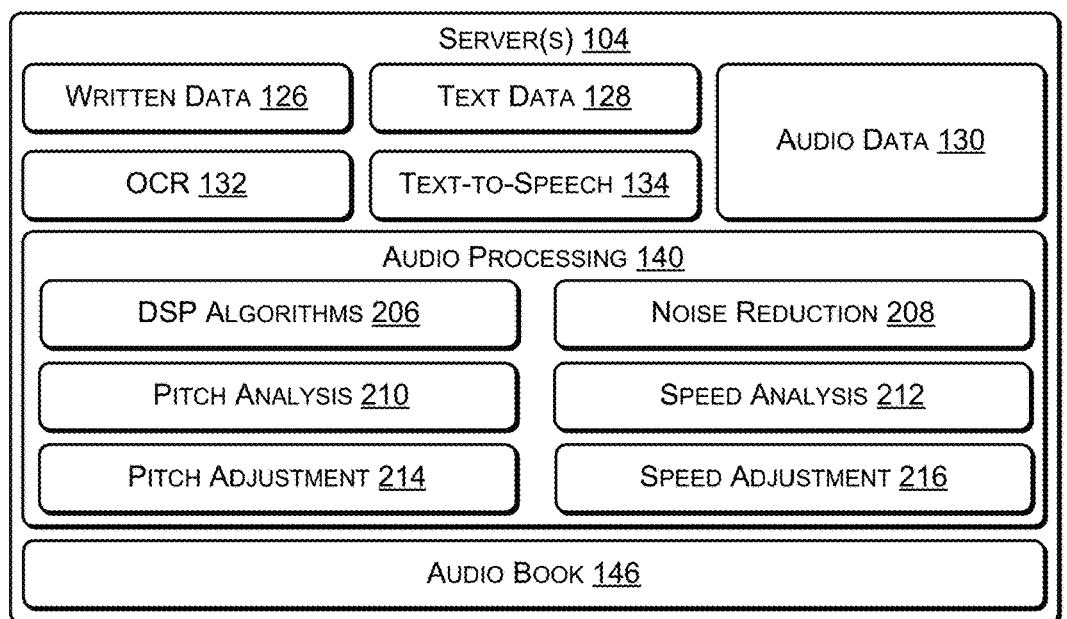
FIG. 2 is a block diagram of a system that includes an audio processing module, according to some embodiments.

FIG. 2 is a block diagram of a system 200 that includes an audio processing module, according to some embodiments. FIG. 2 provides more detail regarding the audio processing module 140.

The audio processing module 140 may include one or more digital signal processing (DSP) algorithms 206 (e.g., implemented in software, firmware, hardware, or any combination thereof). The DSP algorithms 206 may perform noise reduction 208 to the audio data 130 prior to creating the audio book 146. For example, the noise reduction 208 may use multiple frequency bands in the speech band to identify the frequencies associated with the primary user's speech and then create a single speech band. For example, a male voice typically occupies the frequencies 85 to 180 Hertz (Hz) while a female voice typically occupies the frequencies 165 to 255 Hz. The DSP algorithms 206 may use at least 4 bands, e.g., (1) below 85 Hz, (2) 85 Hz-170 Hz, (3) 171 Hz-255 Hz, and (4) above 255 Hz to perform an analysis of a portion of the audio data 130 and determine which frequencies the primary speaker's speech occupies. Based on this analysis, the noise reduction 208 may divide the audio data 130 into three bands. For example, if the analysis of the audio data 130 indicates that the author 128 is speaking between approximately 85 Hz-180 Hz, the noise reduction 208 may create three bands, e.g., (1) below 85 Hz, (2) between 85 Hz-180 Hz, and (3) above 180 Hz and reduce a volume of frequency bands (1) and (3) to attenuate unwanted signals, thereby improving the intelligibility of the voice band (e.g., between 85 Hz-180 Hz). As another example, if the analysis of the audio data 130 indicates that the author 128 is speaking between approximately 165 Hz-255 Hz, the audio algorithm may create three bands, e.g., (1) below 165 Hz, (2) between 165 Hz-255 Hz, and (3) above 255 Hz. The noise reduction 208 may reduce a volume of frequency bands (1) and (3) to attenuate unwanted signals, thereby improving the intelligibility of the voice band (e.g., between 165 Hz-255 Hz).

The DSP algorithms 206 may perform a pitch analysis 210 of the audio data 130. If the pitch analysis 210 determines that a pitch of the author's voice is outside of a particular range (e.g., 85 Hz-255 Hz), the DSP algorithms 206 may perform a pitch adjustment 214 to adjust the pitch of the audio data 130 to fall within the particular range. For example, if the pitch is lower than 85 Hz, then the pitch may be adjusted to approximately 85 Hz (or higher) using the pitch adjustment 214. As another example, if the pitch is greater than 255 Hz, then the pitch may be adjusted to approximately 255 Hz (or lower) using the pitch adjustment 214. In this way, listeners of the audio book 146 may find the pitch of the audio book 146 to be within a normal range.

The DSP algorithms 206 may perform a speed analysis 212 of the audio data 130. The speed analysis 212 may determine an average speed at which the author 128 is speaking is the audio data 130. A typical human speaks at about 135 words per minute (wpm). Thus, a normal speaking speed may be between about a range of about 120 wpm to about 150 wpm. If the speed analysis 212 determines that the speed at which the author 128 has spoken at least a portion of the audio data 130 is greater than 150 wpm or less than 120 wpm, then the speed of the narration in the audio data 130 may be adjusted to fall within the range 120-150 wpm. In some cases, the speed adjustment 216 may be performed by selectively shortening or lengthening pauses between words. For example, to increase the speed, the speed adjustment 216 may shorten the pauses between words and to decrease the speed the speed adjustment 216 may lengthen the pauses between words.

Thus, the audio processing module may use DSP algorithms to perform various types of audio processing to audio data submitted by the author prior to creating an audio book. For example, the audio processing may include performing noise reduction, pitch adjustment, speed adjustment, or any combination thereof. The purpose of the audio processing may be to provide a pleasant listening experience when a listener listens to the audio book.

Figure 3:
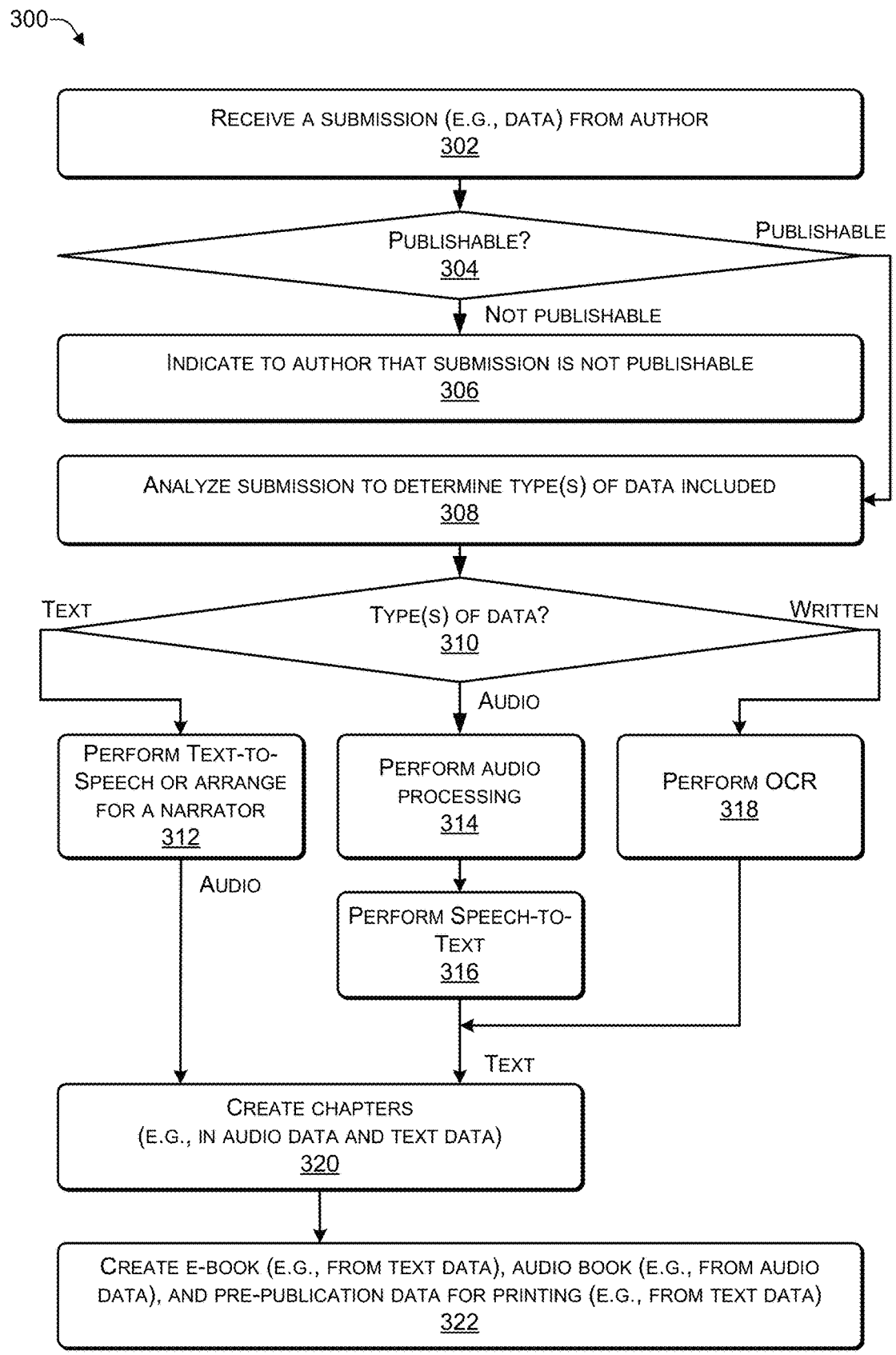
FIG. 3 is a flowchart of a process that includes creating an e-book, an audio book, and pre-publication data from a submission, according to some embodiments.
Figure 4:
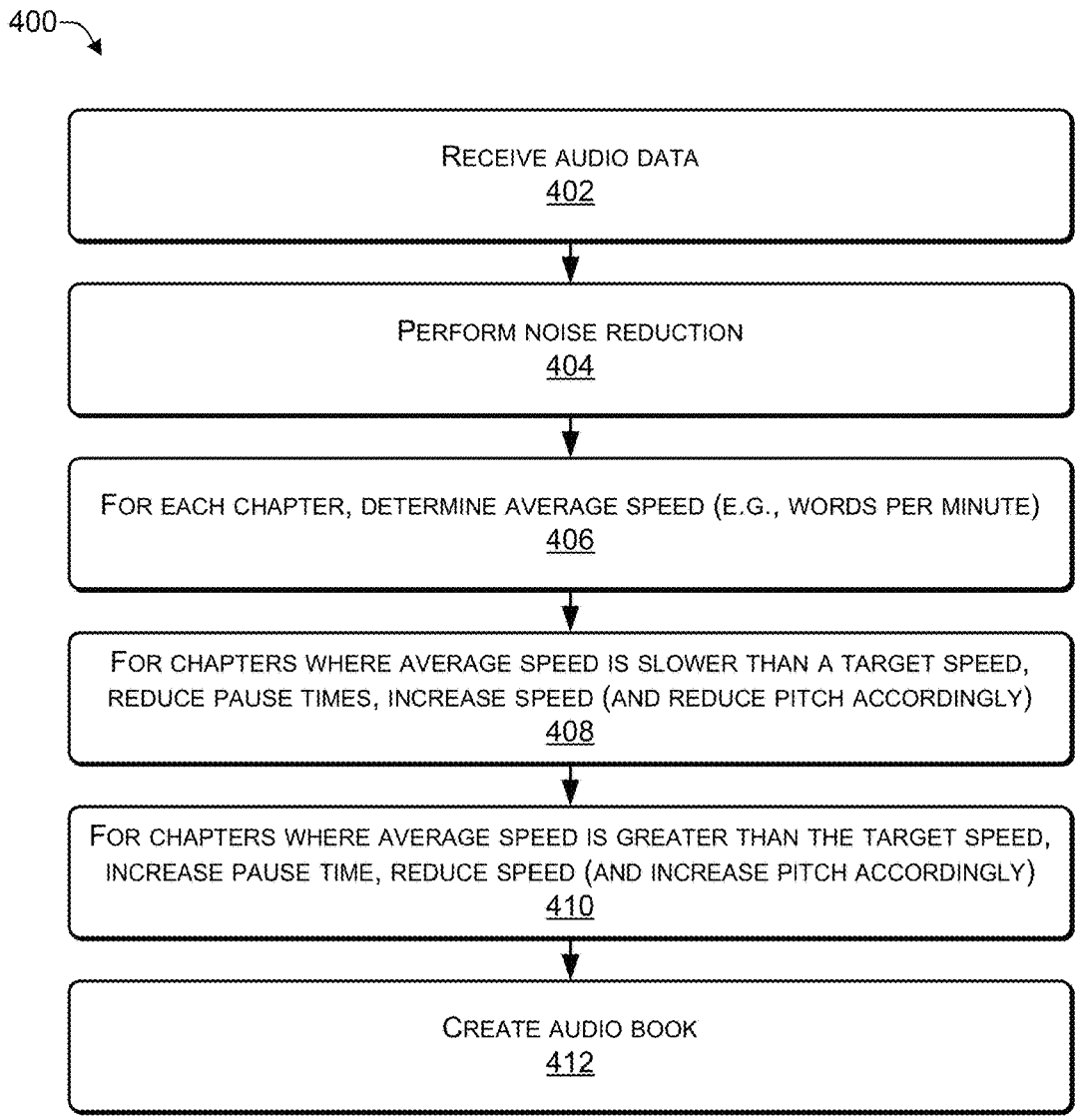
FIG. 4 is a flowchart of a process that includes creating an audio book after receiving audio data, according to some embodiments.

In the flow diagram of FIGS. 3 and 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300 and 400 are described with reference to FIGS. 1 and 2 as described above, although other models, frameworks, systems and environments may be used to implement this process.

FIG. 3 is a flowchart of a process 300 that includes creating an e-book, an audio book, and pre-publication data from a submission, according to some embodiments. The process 300 may be performed by a server, such as the server 104 of FIGS. 1 and 2.

At 302, the server may receive a submission from an author. At 304, the server may determine whether the submission is publishable. If the server determines, at 304, that the submission is not publishable, then the server may indicate to the author, at 306, that the submission is not publishable, and the process may end. For example, in FIG. 1, the server 104 may receive the data 122 submitted by the author 128 and perform the publication check 125 to determine if the data 122 is publishable and whether the author 128 is publishable. If the publication check 125 indicates that the submission data 122 or the author 128 is not publishable, then the server 104 may notify the author 128 that the submission data 122 or the author 128 is not publishable.

If the server determines, at 304, that the submission is publishable, then the server may, at 308, analyze the submission to determine the different types of data included in the submission. For example, in FIG. 1, the analyzer 124 may analyze the data 122 to determine whether the data 122 includes the written data 126, the text data 128, the audio data 130, or any combination thereof.

At 310, based on the types of data in the submission, the server may perform one or more actions. If the server determines, at 310, that the submission includes text data, then the process may proceed to 312, where the server performs (i) a text-to-speech conversion of the text data or (ii) arranges for a narrator to read the text data out loud to create an audio file. If the server determines, at 310, that the submission includes audio data, then the process may proceed to 314, where the server performs audio processing followed by, at 316, speech-to-text conversion to create a text file. If the server determines, at 310, that the submission includes written data, then the server may, at 318, perform optical character recognition (OCR) on the submitted data to create a text file. For example, in FIG. 1, if the analyzer 124 determines that the data 122 includes the text data 128, then the server 104 may use the text-to-speech 134 to create the audio data 130 or the server 104 may request the narrator 162 use the audio recording device 158 to create the audio data 130. If the analyzer 124 determines that the data 122 includes the audio data 130, then the server 104 may use the audio processing module 140 to process the audio data 130 and then use the speech-to-text 136 to convert the audio data 130 into the text data 128. If the analyzer 124 determines that the data 122 includes the written data 126, then the server 104 may use the OCR 132 to convert the written data 126 into the text data 128.

At 320, the server may create chapters in (i) the audio file created as a result of 310 and (ii) the text file created at a as a result of 316 or 318. For example, in FIG. 1, the chapter determination module 138 may be used to determine the chapters for the printable book, the e-book, and the audio book. For example, the audio data 130 may include multiple audio files that have each been labeled with a name of a chapter. To illustrate, a first audio file of the audio data 130 may be labeled "chapter 1", a second audio file of the audio data 130 may be labeled "chapter 2", and so on. The text data 128 may include labels in the text data 128 to introduce each chapter, such as "chapter 1" to indicate the start of the first chapter, "chapter 2" to indicate the end of the first chapter and to indicate the start of the second chapter, and so on. In some cases, the machine learning algorithm 148 may be used to predict the beginning of each chapter in the audio data 130, in the text data 128, or both.

At 322, the server may create an e-book from the text data, an audio book from the audio data, and pre-publication data (e.g., suitable for printing) from the text data. For example, in FIG. 1, the server 104 may create the printable data 142 and the e-book 144 based on the text data 128 and create the audio book 146 based on the audio data 130.

Thus, a server may receive a submission from an author and determine whether the submission is publishable. If the server determines that the submission is not publishable, then the server may inform the author that the submission is not publishable. If the server determines that the submission is publishable, then the server may analyze the submission to identify the different types of data, e.g., text data, audio data, and written data, included in the submission. The server may use text-to-speech on the text data from the submission or arrange for a narrator to read out the text data from the submission to create audio data. The server may perform audio processing on the audio data from the submission and then use speech-to-text to create text data. The server may perform OCR on the written data from the submission to create text data. In this way, an author can submit one or more files and the server may automatically create an e-book, an audio book, and a printable book based on the submitted files.

FIG. 4 is a flowchart of a process 400 that includes creating an audio book after receiving audio data, according to some embodiments. The process 300 may be performed by one or more components of a server, such as the audio processing module 140 of FIGS. 1 and 2.

At 402, the audio processing module may receive audio data. At 404, the audio processing module may perform noise reduction. For example, in FIG. 2, the audio processing module 140 may receive the audio data 130 and use the noise reduction module 208 to perform noise reduction on the audio data 130.

At 406, for each audio chapter, the audio processing module may determine an average speed (e.g., in words per minute). At 408, for chapters where the average speed is slower than a target speed, the audio processing module may reduce a length of time between words (e.g., reduce a length of pauses), increase a playback speed and reduce pitch accordingly, or both. For example, in FIG. 2, the audio processing module 140 may perform the speed analysis 212 to determine a speed at which the audio data 130 is being narrated. The speed adjustment 216 and/or the pitch adjustment 214 may be used to reduce the length of time between words by reducing a length of pauses between words, speeding up the audio playback speed and reducing the pitch accordingly, or both.

At 410, for chapters where the average speed is greater than the target speed, the audio processing module may increase a length of time between words (e.g., increase a length of pauses), reduce a playback speed and reduce pitch accordingly, or both. For example, in FIG. 2, the audio processing module 140 may perform the speed analysis 212 to determine a speed at which the audio data 130 is being narrated. The speed adjustment 216 and/or the pitch adjustment 214 may be used to increase the length of time between words by increasing a length of pauses between words, slowing down the audio playback speed and increasing the pitch accordingly, or both.

At 412, the audio processing module may create an audio book based on the audio data modified by one or more of 404, 410, and 412. For example, in FIG. 2, the audio processing module 140 may create the audio book 146 after performing the audio processing 140.

Thus, prior to creating an audio book, an audio processing module may use DSP algorithms to perform various types of audio processing to audio data submitted by an author. For example, the audio processing may perform noise reduction, pitch adjustment, speed adjustment, or any combination thereof. The purpose of the audio processing may be to provide an audio book that features narration with a pleasant pitch and at a speed that is easy for listeners to hear.

Figure 5:
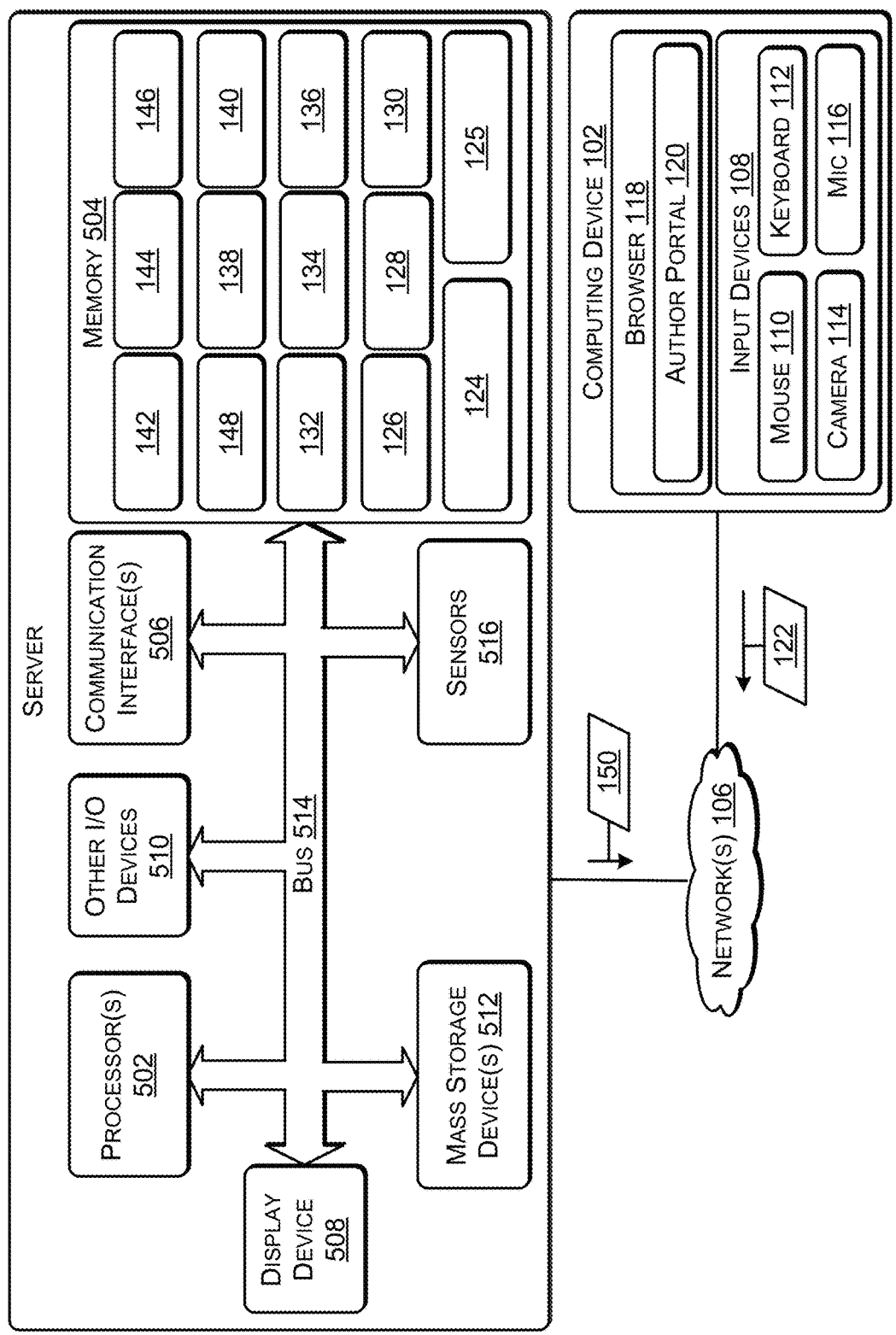
FIG. 5 illustrates an example configuration of a computing device that can be used to implement the systems and techniques described herein.

FIG. 5 illustrates an example configuration of a device 500 that can be used to implement the systems and techniques described herein, such as for example, the computing device 102, the audio recording device 158, and the server 104 of FIG. 1. For illustration purposes, the device 500 is shown in FIG. 5 as implementing the server 104 of FIGS. 1 and 2.

The device 500 may include one or more processors 502 (e.g., central processing unit (CPU), graphics processing unit (GPU), or the like), a memory 504, communication interfaces 506, a display device 508, other input/output (I/O) devices 510 (e.g., the input devices 108 of FIG. 1), and one or more mass storage devices 512 (e.g., disk drive, solid state disk drive, or the like), configured to communicate with each other, such as via one or more system buses 514 or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., Thunder-Bolt®, digital video interface (DVI), high definition media interface (HDMI), and the like), power buses, etc.

The processors 502 are one or more hardware devices that may include a single processing unit or a number of processing units, all of which may include single or multiple computing units or multiple cores. The processors 502 may include a graphics processing unit (GPU) that is integrated into the CPU or the GPU may be a separate processor device from the CPU. The processors 502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 502 may be configured to fetch and execute computer-readable instructions stored in the memory 504, mass storage devices 512, or other computer-readable media.

Memory 504 and mass storage devices 512 are examples of computer storage media (e.g., memory storage devices) for storing instructions that can be executed by the processors 502 to perform the various functions described herein. For example, memory 504 may include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein and may be any type of non-transitory media capable of storing computer-readable, processor-executable program instructions as computer program code that can be executed by the processors 502 as a particular machine configured for carrying out the operations and functions described in the implementations herein.

The device 500 may include one or more communication interfaces 506 for exchanging data via the network 110. The communication interfaces 506 can facilitate communications within a wide variety of networks and protocol types, including wired networks (e.g., Ethernet, Data Over Cable Service Interface Specification (DOCSIS), digital subscriber line (DSL), Fiberoptic, USB etc.) and wireless networks (e.g., wireless local area network (WLAN), global system for mobile (GSM), code division multiple access (CDMA), Wi-Fi (802.11), Bluetooth, Wireless USB, ZigBee, cellular, satellite, etc.), the Internet and the like. Communication interfaces 506 can also provide communication with external storage, such as a storage array, network attached storage, storage area network, cloud storage, or the like.

The display device 508 may be used for displaying content (e.g., information and images) to users. Other I/O devices 510 may be devices that receive various inputs from a user and provide various outputs to the user, and may include a keyboard, a touchpad, a mouse, a printer, audio input/output devices, and so forth.

The computer storage media, such as memory 116 and mass storage devices 512, may be used to store software and data, including, for example, the analyzer 124, the publication check 125, the written data 126, the text data 128, the audio data 130, the OCR 132, the text-to-speech 134, the speech-to-text 136, the machine learning 148, the chapter determination module 138, the audio processing module 140, the printable data 142, the e-book 144, the audio book 146, or any combination thereof.

For example, the author 128 may use the computing device 102 to record the audio data 130. Creating the audio data 130 enables authors that do not have access to a keyboard, have limited reading and/or writing skills, or the like, to be able to publish a printed book, and audio book, and an e-book from a single file. The author 128 is able to create the audio data 130 by speaking into the microphone 116 to record the author's own words. After submitting the audio data 130 to the server 104 (that is associated with a publisher), the server 104 may use the audio data 130 to create the audio book 146, and use text-to-speech 134 to convert the audio data 130 into the text data 128 used to create the e-book 144, the printable data 142, or both. In this way, if the author 128 has limited skills (e.g., typing skills) or lacks access to a keyboard, the author 128 is able to submit a single file (e.g., the audio data 130) that the publisher can use to create the audio book 146, the e-book 144, and the printable data 142. For example, incarcerated inmates are able to author and publish a book in all three formats by creating a single audio file. As another example, those having disabilities that limit their ability to use a keyboard to create a text file are able to author and publish a book in all three formats without having to type.

As another example, the author 128 may have limited access to a computing device, such as the computing device 102. The author 128 may create a manuscript by manually (e.g., by hand) printing or writing a manuscript, scan the manuscript, and send the scanned manuscript as the written data 126 to the server 104 of the publisher. The server 104 uses OCR 132 to convert the written data 126 into the text data 128 that can be used to create the printable data 142 and the e-book 144. In some cases, the author 128 may also include the audio data 130 in the data 122. The audio data 122 may be created by capturing, using the microphone 116 of the computing device 102, the author 128 reading out loud the contents of the book. In such cases, the publisher may use the audio data 122 to create the audio book 146. If the author 128 provides both the written data 126 and the audio data 130, the server 104 may convert the written data 126 into a first text file using the OCR 132, convert the audio data 130 into a second text file using the speech-to-text 136, and compare the two text files to identify and address typographical, spelling, and other types of errors. In other cases, e.g., where the author 128 has not provided the audio data 130, the server 104 may record the narrator 160 reading the manuscript (e.g., the written data 126 or the text data 128) out loud to create the audio book 146. In still other cases, the server may use the text-to-speech 134 to convert the text data 128 into the audio data 130.

As a further example, the author 128 may use the input devices 108, such as the keyboard 112, of the computing device 102 to create the text data 128 (e.g., in a format such as Word®, Pages, PDF, text, or the like) and send the text data 128 to the server 104 of the publisher. The server 104 may use the text data 128 to create the printable data 142 and the e-book 144. In some cases, the author 128 may also provide the audio data 130 in which the author 128 has captured (e.g., using the computing device 102) the author 128 reading out loud the contents of the book. In such cases, the server 104 may use the audio data 130 to create the audio book 146. If the author 128 provides both the text data 128 and the audio data 130, the server 104 may convert the audio data 130 into a second text file using the speech-to-text 136, and compare the two text files to identify and address typographical, spelling, and other types of errors. In other cases, e.g., where the author 128 has not provided the audio data 130, the server 104 may instruct the narrator 160 to read the text data 128 out loud and capture the resulting audio to create the audio book 146. In still other cases, the server 104 may use the text-to-speech 136 to convert the text data 128 into the audio data 130.

Thus, an author may create one or more data files and send them to a server associated with a publisher. For example, the data files may include an audio file of the author reading out loud, a text-based file (e.g., text, Word compatible, PDF compatible, Pages compatible, or the like) created by using an input device (e.g., a keyboard), a scan of a handwritten manuscript, or any combination thereof. Based on the type of data file said, the publisher may use various techniques, as described herein, to create an audio book, an e-book, and a printable book.

There are several advantages of the systems and techniques described herein. First, an author can submit a single file and have the file published in three formats, e.g., as an audio book, as an e-book, and as a printed publication. Second, authors can use whatever means are at their disposal to create the single file. For example, those incarcerated in a prison can create and submit an audio file, a handwritten manuscript, a typed manuscript, or any combination thereof. Third, authors with disabilities, such as those who are unable (or have limited capabilities) to write or type, are able to submit an audio file while those who are unable (or have limited capabilities) to speak are able to submit a handwritten or typed manuscript. In this way, publishing a book is made accessible to a large number of people as compared to conventional techniques where the author submits a text-based manuscript in a particular format specified by the publisher.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, by a server and from a computing device, a submission created by an author, wherein the submission comprises:
   book data associated with a book, the book data comprising audio data, handwritten data, text data, or any combination thereof; and
   author data associated with the author, the author data comprising incarceration data indicating whether the author was incarcerated, wherein when the incarceration data indicates that the author was incarcerated, the incarceration data includes:
   why the author was incarcerated; and
   where the author was incarcerated;
   based on determining that the incarceration data indicates the author was incarcerated, sending a query to one of a local agency, a state agency, or a federal government agency to determine:
   whether the author is permitted to publish the book data;
   whether the book data glorifies what the author was incarcerated for; and
   whether the book data glorifies crime in general;
   determining whether the book data is detrimental to an image of a publisher;
   determining, after sending the query, that the submission is publishable;
   based on determining that the book data comprises audio data:
   performing audio processing on the audio data and storing the audio data in a memory of the server, the audio processing including noise reduction, pitch adjustment, speed adjustment, or any combination thereof; and
   converting the audio data to text data using speech-to-text;
   based on determining that the book data comprises handwritten data:
   converting, using optical character recognition, the handwritten data to text data; and
   creating, using text-to-speech, the audio data based on the text data;
   based on determining that the book data comprises text data:
   creating, using text-to-speech, the audio data based on the text data;
   creating an audio book based after retrieving the audio data from the memory of the server;
   creating an e-book based on the text data;
   creating a printable book based on the text data;
   publishing, by the server a the printable book, the e-book, and the audio book; and
   making one or more of the printable book, the e-book, and the audio book available for acquisition.

2. The method of claim 1, wherein performing the audio processing on the audio data comprises:
   selectively shortening or lengthening pauses between words in the audio data to achieve a speed of between about 120 words per minute to about 150 words per minute before storing the audio data in the memory of the server.

3. The method of claim 1, further comprising:
   determining that the book data includes chapter information including:
   a name of each chapter; and
   a location of each chapter; and
   adding one or more chapters to individual ones of the audio book, the e-book, the printable book, or any combination thereof based on the chapter information.

4. The method of claim 2, wherein performing audio processing comprises:
   determining that a pitch of a portion of the audio data is outside a frequency range comprising between approximately 85 Hertz to approximately 255 Hertz; and adjusting the pitch of the portion of the audio data to be within the frequency range.

5. The method of claim 1, wherein:
the e-book has a format comprising at least one of epub, azw, mobi, pdf, html, doc, docx, or pages; and
the audio book has a format comprising at least one of a lossless format or a lossy format.

6. The method of claim 1, further comprising:
receiving, from a second computing device, a second submission created by a second author, wherein the second submission comprises:
second book data associated with a second book; and
second author data associated with the second author;
determining, based on the second author data and the second book data, that the second submission is unpublishable; and
sending a message to the second author indicating that the second submission is unpublishable.

7. The method of claim 6, wherein determining, based on the second author data and the second book data, that the second submission is unpublishable comprises:
determining that the second author was incarcerated; and
determining that a content of the second submission is associated with a crime.

8. A server comprising:
one or more processors; and
one or more non-transitory computer readable media storing instructions executable by the one or more processors to perform operations comprising:
receiving, by a server and from a computing device, a submission created by an author, wherein the submission comprises:
book data associated with a book, the book data comprising audio data, handwritten data, text data, or any combination thereof; and
author data associated with the author, the author data comprising incarceration data indicating whether the author was incarcerated, wherein when the incarceration data indicates that the author was incarcerated, the incarceration data includes:
why the author was incarcerated; and
where the author was incarcerated;
based on determining that the incarceration data indicates the author was incarcerated, sending a query to one of a local agency, a state agency, or a federal government agency to determine:
whether the author is permitted to publish the book data; , including:
determining whether the book data glorifies what the author was incarcerated for; and
determining whether the book data glorifies crime in general;
determining whether the book data is detrimental to an image of a publisher; or
any combination thereof;
determining whether the book data is detrimental to an image of a publisher;
determining, after sending the query, that the submission is publishable;
based on determining that the book data comprises audio data:
performing audio processing on the audio data and storing the audio data in the computer readable media, the audio processing including noise reduction, pitch adjustment, speed adjustment, or any combination thereof; and converting the audio data to text data using speech-to-text;
based on determining that the book data comprises handwritten data:
converting, using optical character recognition, the handwritten data to text data; and
creating, using text-to-speech, the audio data based on the text data;
based on determining that the book data comprises text data:
creating, using text-to-speech, the audio data based on the text data;
creating an audio book after retrieving the audio data from the computer readable media;
creating an e-book based on the text data;
creating a printable book based on the text data;
publishing the printable book, the e-book, and the audio book; and
making one or more of the printable book, the e-book, and the audio book available for acquisition.

9. The server of claim 8, wherein performing the audio processing on the audio data comprises:
determining that a pitch of a portion of the audio data is outside a frequency range comprising between approximately 85 Hertz to approximately 255 Hertz; and
adjusting the pitch of the portion of the audio data to be within the frequency range.

10. The server of claim 8, the operations further comprising:
receiving, from a second computing device, a second submission created by a second author, wherein the second submission comprises:
second book data associated with a second book; and
second author data associated with the second author;
determining, based on the second author data and the second book data, that the second submission is unpublishable; and
sending a message to the second author indicating that the second submission is unpublishable.

11. The server of claim 10, wherein determining, based on the second author data and the second book data, that the second submission is unpublishable comprises:
determining that the second author was incarcerated; and
determining that a content of the second submission is associated with a crime including a particular crime associated with a reason why the second author was incarcerated.

12. The server of claim 8, the operations further comprising:
determining that the book data includes chapter information including:
a name of each chapter; and
a location of each chapter; and
adding one or more chapters to individual ones of the audio book, the e-book, the printable book, or any combination thereof based on the chapter information.

13. The server of claim 8, wherein performing the audio processing on the audio data comprises:
determining that a speed at which the author is performing a narration in the audio data is outside a speed range comprising between about 120 words per minute to about 150 words per minute;
based on determining that the speed at which the author is performing the narration in the audio data is less than about 120 words per minute, reducing a time of one or more pauses between words in the narration to increase the speed of the narration in the audio data to be within the speed range; and based on determining that the speed at which the author is performing the narration in the audio data is greater than about 150 words per minute, increasing a time of the one or more pauses between a plurality of words spoken in the narration to increase the speed of the narration in the audio data to be within the speed range.

14. The server of claim 12, wherein performing the audio processing on the audio data comprises:

capturing a portion of audio in a pause between words in the audio data;

performing a frequency analysis of the portion of audio in the pause between a plurality of words spoken; and performing noise reduction by removing, from the audio data, at least a portion of frequencies identified in the frequency analysis.

15. One or more non-transitory computer-readable media storing instructions executable by one or more processors to perform operations comprising:

receiving, by a server and from a computing device, a submission created by an author, wherein the submission comprises:

book data associated with a book, the book data comprising audio data, handwritten data, text data, or any combination thereof; and author data associated with the author, the author data comprising incarceration data indicating whether the author was incarcerated, wherein when the incarceration data indicates that the author was incarcerated, the incarceration data includes:

why the author was incarcerated; and where the author was incarcerated;

based on determining that the incarceration data indicates the author was incarcerated, sending a query to one of a local agency, a state agency, or a federal government agency to determine:

whether the author is permitted to publish the book data;

whether the book data glorifies what the author was incarcerated for;

whether the book data glorifies crime in general;

determining whether the book data is detrimental to an image of a publisher;

determining, based at least in part on the author data, that the submission is publishable;

based on determining that the book data comprises audio data:

performing audio processing on the audio data and storing the audio data in a memory of the server, the audio processing including noise reduction, pitch adjustment, speed adjustment, or any combination thereof; and converting the audio data to text data using speech-to-text;

based on determining that the book data comprises handwritten data:

converting, using optical character recognition, the handwritten data to text data; and creating, using text-to-speech, the audio data based on the text data;

based on determining that the book data comprises text data:

creating, using text-to-speech, the audio data based on the text data;

creating an audio book based on either the audio data;

creating an e-book based on the text data;

creating a printable book based on the text data;

publishing the printable book, the e-book, and the audio book; and making one or more of the printable book, the e-book, and the audio book available for acquisition.

16. The one or more non-transitory computer readable media of claim 15, wherein performing the audio processing on the audio data comprises:

determining that a speed at which the author is performing a narration in the audio data is outside a speed range comprising between about 120 words per minute to about 150 words per minute;

based on determining that the speed at which the author is performing the narration in the audio data is less than about 120 words per minute, reducing a time of one or more pauses between words in the narration to increase the speed of the narration in the audio data to be within the speed range; and based on determining that the speed at which the author is performing the narration in the audio data is greater than about 150 words per minute, increasing a time of the one or more pauses between a plurality of words spoken in the narration to increase the speed of the narration in the audio data to be within the speed range.

17. The one or more non-transitory computer readable media of claim 15, the operations further comprising:

determining that the book data includes chapter information including:

a name of each chapter; and a location of each chapter; and adding one or more chapters to individual ones of the audio book, the e-book, the printable book, or any combination thereof based on the chapter information.

18. The one or more non-transitory computer readable media of claim 15, performing audio processing on the audio data comprises:

based on determining that a pitch of an author's voice in the audio data is lower than 85 Hertz, adjusting the pitch to approximately 85 Hertz or higher; and based on determining that the pitch of the author's voice in the audio data is greater than 255 Hertz, adjusting the pitch to approximately 255 Hertz or lower.

19. The one or more non-transitory computer readable media of claim 15, the operations further comprising:

receiving, from a second computing device, a second submission created by a second author, wherein the second submission comprises:

second book data associated with a second book; and second author data associated with the second author;

determining, based on the second author data and the second book data, that the second submission is unpublishable; and sending a message to the second author indicating that the second submission is unpublishable.

20. The one or more non-transitory computer readable media of claim 19, wherein determining, based on the second author data and the second book data, that the second submission is unpublishable comprises:

determining that the second author was incarcerated; and determining that a content of the second submission is associated with a crime.

* * * * *